(12) United States Patent
Dhanuka et al.

(10) Patent No.: US 12,524,934 B2
(45) Date of Patent: Jan. 13, 2026

(54) DIGITAL OBJECT FUSION SYSTEM

(71) Applicant: Adobe Inc., San Jose, CA (US)

(72) Inventors: Praveen Kumar Dhanuka, Howrah (IN); Shivi Pal, Nodia (IN); Arushi Jain, Ashok Vihar (IN)

(73) Assignee: Adobe Inc., San Jose, CA (US)

( * ) Notice: Subject to any disclaimer, the term of this patent is extended or adjusted under 35 U.S.C. 154(b) by 318 days.

(21) Appl. No.: 18/361,824

(22) Filed: Jul. 29, 2023

(65) Prior Publication Data
US 2025/0037330 A1   Jan. 30, 2025

(51) Int. Cl.
*G06T 11/20*   (2006.01)
*G06T 11/00*   (2006.01)

(52) U.S. Cl.
CPC .......... *G06T 11/203* (2013.01); *G06T 11/001* (2013.01); *G06T 2210/62* (2013.01)

(58) Field of Classification Search
CPC .. G06T 11/203; G06T 11/001; G06T 2210/62
USPC ........................................................ 345/467
See application file for complete search history.

(56) References Cited

U.S. PATENT DOCUMENTS

| | | | |
|---|---|---|---|
| 10,319,129 B2 | 6/2019 | Dhanuka et al. | |
| 10,497,158 B2 * | 12/2019 | Jain | G06T 11/203 |
| 10,997,770 B1 * | 5/2021 | Kumawat | G06F 40/109 |
| 11,244,486 B2 | 2/2022 | Agrawal et al. | |
| 11,631,207 B2 * | 4/2023 | Agrawal | G06T 11/203 |
| | | | 345/471 |
| 11,755,817 B2 | 9/2023 | Dhanuka et al. | |
| 11,769,281 B2 * | 9/2023 | Beri | G06F 3/04847 |
| | | | 345/469 |
| 12,073,499 B2 * | 8/2024 | Dhanuka | G06T 11/60 |
| 2011/0007970 A1 | 1/2011 | Saund | |
| 2013/0093794 A1 | 4/2013 | Dairman et al. | |
| 2014/0115452 A1 | 4/2014 | Rudolph et al. | |
| 2018/0253878 A1 * | 9/2018 | Jain | G06T 11/203 |
| 2019/0317980 A1 | 10/2019 | Dhanuka et al. | |
| 2020/0026501 A1 | 1/2020 | Baldwin et al. | |
| 2020/0097525 A1 * | 3/2020 | Dhanuka | G06F 16/5838 |
| 2023/0035439 A1 | 2/2023 | Dhanuka | |
| 2023/0072081 A1 * | 3/2023 | Agrawal | G06F 40/109 |
| 2023/0245356 A1 * | 8/2023 | Beri | G06T 11/203 |
| | | | 345/469 |

(Continued)

OTHER PUBLICATIONS

U.S. Appl. No. 17/985,431, "Non-Final Office Action", U.S. Appl. No. 17/985,431, Mar. 14, 2024, 21 pages.

(Continued)

*Primary Examiner* — Sheree N Brown
(74) *Attorney, Agent, or Firm* — FIG. 1 Patents

(57) ABSTRACT

Digital object fusion techniques and systems are described. In one or more examples, a base object and an adornment object are received and anchor points of the base object and the adornment object are detected by a digital object fusion system. The digital object fusion system then identifies linked anchor points from the anchor points as supporting a link between the base object and the adornment object. A path is fused by the digital object fusion system that defines the base object and the adornment object based at least in part on the linked anchor points. From this, a fused object is generated by the digital object fusion system by propagating visual style data to the path from the base object or the adornment object.

20 Claims, 9 Drawing Sheets

(56) References Cited

U.S. PATENT DOCUMENTS

2024/0161361 A1* 5/2024 Dhanuka ............... G06T 11/203
2025/0029294 A1* 1/2025 Dhanuka ............... G06T 11/203

OTHER PUBLICATIONS

U.S. Appl. No. 17/985,431, "Notice of Allowance", U.S. Appl. No. 17/985,431, May 23, 2024, 8 pages.
Crystal, et al., "How to add tails to font in Design Space", https://www.youtube.com/watch?v=hmCgl45IVs, 2019, 11 pages.
Sarah, "How to Make Name Flowers on Cricut Design Space", https://www.youtube.com/watch?v=CXOCU2FE2VU&t=1298s, 2022, 8 pages.
"Anchored objects", Adobe, Inc. [retrieved Nov. 1, 2022]. Retrieved from the Internet <https://helpx.adobe.com/in/indesign/using/anchored-objects.html>., Apr. 12, 2022, 16 Pages.
U.S. Appl. No. 17/391,536 , "Non-Final Office Action", U.S. Appl. No. 17/391,536, Apr. 19, 2023, 12 pages.
U.S. Appl. No. 17/391,536 , "Non-Final Office Action", U.S. Appl. No. 17/391,536, Dec. 14, 2022, 12 pages.
U.S. Appl. No. 17/391,536 , "Notice of Allowance", U.S. Appl. No. 17/391,536, Jul. 21, 2023, 5 pages.
Bentley, J.L., et al., "Algorithms for Reporting and Counting Geometric Intersections", IEEE Transactions on Computers, vol. C-28, No. 9 [retrieved Jun. 15, 2023]. Retrieved from the Internet <http://www.itseng.org/research/papers/topics/VLSI_Physical_Design_Automation/Physical_Verification/DRC/Geometric_Intersection_Problems/1979-Bentley.pdf>., Sep. 1979, 5 Pages.
Dhanuka, Praveen Kumar, et al., "US Application as Filed", U.S. Appl. No. 17/391,536, filed Aug. 2, 2021, 73 pages.

* cited by examiner

DIGITAL OBJECT FUSION SYSTEM

BACKGROUND

Digital objects are used as a basic building block by image processing systems to create and edit a variety of types of digital content, such as digital images, screens of a user interface, webpages, frames of a digital video, environments for use in video games, logos, and so forth. Oftentimes, combinations of digital objects are used to convey an artistic idea and add richness to the objects as part of digital content creation, such as to create a stylized logo in which text is adorned with an additional digital object.

Conventional techniques used to support these combinations of digital objects, however, result in a disjointed appearance and may destroy an underlying editability of the objects. For example, modifications made to glyphs using conventional techniques destroy editability of the glyphs as part of "live text" in combination with other glyphs disposed along with a modified glyph.

SUMMARY

Digital object fusion techniques and systems are described. The digital object fusion system is configured to support fusion of a base object (e.g., a glyph) with an adornment object without destroying an underlying definition of the base object or the adornment object, e.g., as "live text." In one or more examples, a base object and an adornment object are received and anchor points of the base object and the adornment object are detected by a digital object fusion system. The digital object fusion system then identifies linked anchor points from the anchor points as supporting a link between the base object and the adornment object. A path is fused by the digital object fusion system that defines the base object and the adornment object based at least in part on the linked anchor points. From this, a fused object is generated by the digital object fusion system by propagating visual style data to the path from the base object or the adornment object.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
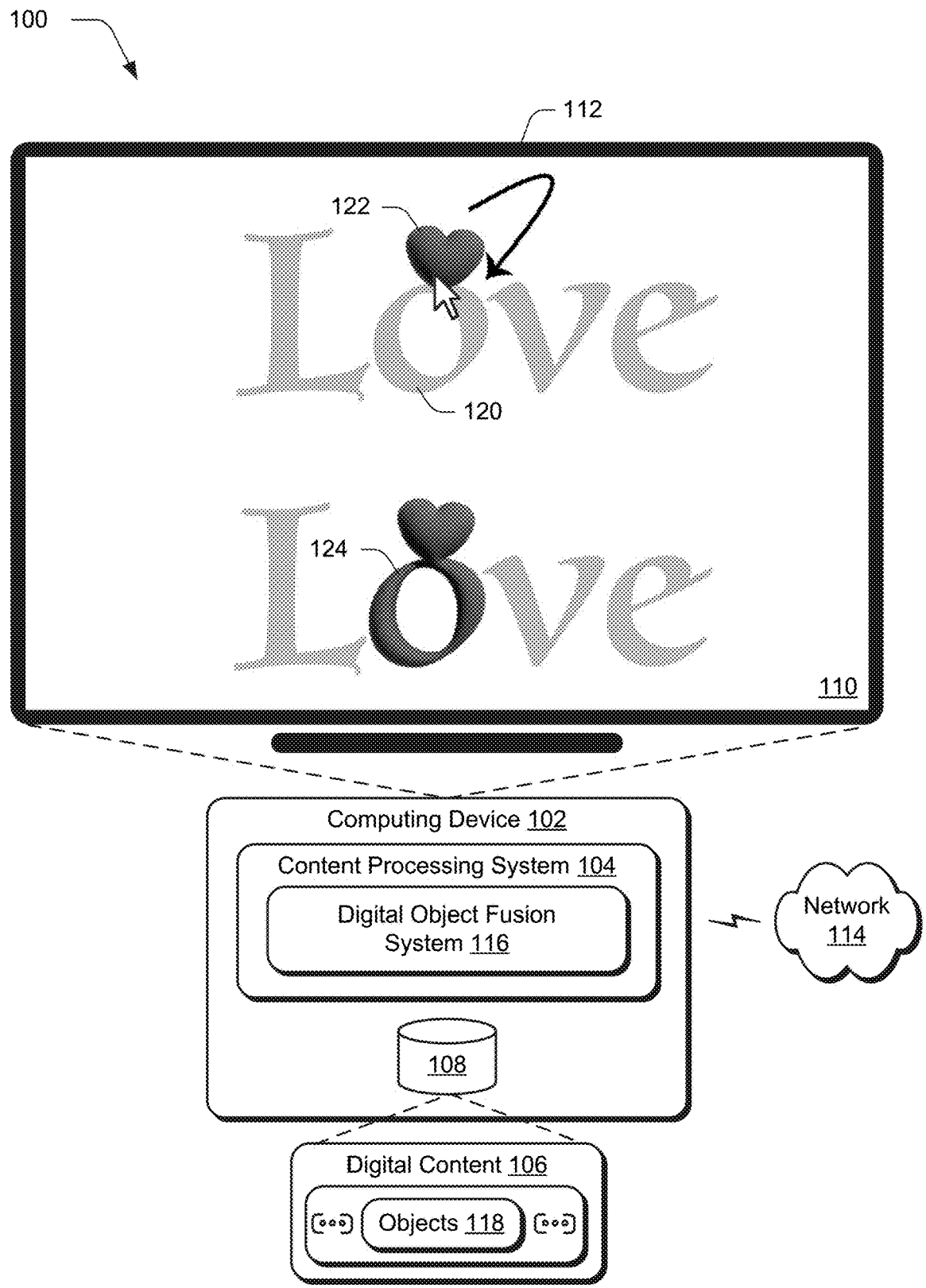
FIG. 1 is an illustration of an environment in an example implementation that is operable to employ digital object fusion techniques described herein.

Digital objects are configurable in a variety of ways to convey a variety of meanings through visual representation of the digital objects. An example of which includes glyphs, which are usable to communicate a wide variety of textual information as well as convey artistic expression by defining how characters, numbers, symbols, and so forth are represented as part of digital content. Glyphs, for instance, may be used as a basis to form a stylized logo through addition of an adornment object to a base object of the glyph, e.g., to add a flame to a letter to convey a visual effect that the letter is on fire.

However, conventional techniques used to form a combination of the base object (e.g., the glyph) with an adornment object (e.g., the flame) in conventional techniques destroys an underlying definition of the base object. Consequently, the base object as modified by the adornment object is no longer suitable for use in a variety of digital image editing operations. An example of which includes typographic operations used to edit text, e.g., resize characters, change arrangements, reformatting, spacing, and which glyphs are included as part of the text, and so forth.

To address these technical challenges, a digital object fusion system is described that is configured to support fusion of a base object (e.g., a glyph) with an adornment object without destroying an underlying definition of the base object or the adornment object, e.g., as "live text." As a result, the digital object fusion system supports continued use of digital editing functionality, including continued use of typographic operations that is not possible in conventional techniques.

In one or more examples, a base object and an adornment object are displayed in a user interface of a content processing system, e.g., a glyph of a letter "I" and an adornment object depicting an icicle. A digital object fusion system then detects an input to initiate a fusion operation to combine the adornment object with the base object. The input, for instance, is detectable based on movement of the adornment object to within a threshold distance of the base object, selection of an option in a menu, spoken utterance, a gesture, and so forth.

In response, the digital object fusion system detects anchor points of the base object and the adornment object.

The anchor points, for instance, are usable to specify a sequence of curves (e.g., Bezier curves) that define the respective objects, e.g., as an outline defining an outer boundary of the objects, centroids, and so forth.

The digital object fusion system then identifies linked anchor points that are configurable to support a link between the base object and the adornment object. For example, the digital object fusion system identifies intersections of boundaries defined by anchor points of the respective objects. The digital object fusion system in one or more implementations also stores map data as original geometry information of the base and adornment objects along with proximity information of the anchor points to each other from the respective objects and visual style data of the respective objects. This map data is usable in support of nondestructive editing of the base object and the adornment object including an ability to remove edits as further described below.

The linked anchor points are then used as a basis to fuse a path defining the base object and the adornment object. The digital object fusion system, for instance, fuses anchor points of the base object to the anchor points of the adornment object as forming a continuous (e.g., closed) path based on a link formed between the linked anchor points.

Once the path is generated, the digital object fusion system then propagates visual style data to the path, e.g., from the base object or the adornment object. Visual style data, for instance, defines a color profile, stroke profile, textures, and so on used to define a visual appearance of the respective objects. Propagation of the visual style data supports a continuous visual appearance within the path that appears to merge the base object with the adornment object as a fused object.

The fused object, in one or more examples, is included as a node in a render tree along with a node that represents the base object. The node of the base object, for instance, is set with an opacity of zero such that the base object does not contribute to pixels when rendered. During rendering, a rendering module checks if an alternate representation of the adornment object is registered as available, e.g., in a respective node of the render tree. If so, the alternate representation of the fused object is rendered instead of rendering the adornment object. In this way, display of the fused object replaces display of both the base object and the adornment object in the user interface.

Inclusion of both the base object, the adornment object, and the fused object in the render tree also supports subsequent edits to the underlying objects. Continuing with the example above, an initial input is received in which the adornment object is selected and moved within a threshold distance of the base object, which triggers generation of the fused object. A subsequent input may then be received that selects a portion of the fused object that corresponds to the adornment object to move the adornment object past the threshold distance.

In response, the node representing the fused object as an alternate representation is removed from the render tree and opacity of the base object is set to one. This causes the base object to be rendered in the user interface along with the adornment object, separately, as the adornment object no longer has a specified alternate representation in the render tree. In this way, the digital object fusion system supports continued editing of the base object and the adornment object, which is not possible in conventional techniques. Further discussion of these and other examples is included in the following sections and shown in corresponding figures.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Digital Object Fusion Environment

FIG. 1 is an illustration of an environment 100 in an example implementation that is operable to employ digital object fusion techniques described herein. The illustrated environment 100 includes a computing device 102, which is configurable in a variety of ways.

The computing device 102, for instance, is configurable as a desktop computer, a laptop computer, a mobile device (e.g., assuming a handheld configuration such as a tablet or mobile phone), and so forth. Thus, the computing device 102 ranges from full resource devices with substantial memory and processor resources (e.g., personal computers, game consoles) to a low-resource device with limited memory and/or processing resources (e.g., mobile devices). Additionally, although a single computing device 102 is shown, the computing device 102 is also representative of a plurality of different devices, such as multiple servers utilized by a business to perform operations "over the cloud" as described in FIG. 9.

The computing device 102 is illustrated as including a content processing system 104. The content processing system 104 is implemented at least partially in hardware of the computing device 102 to process and transform digital content 106, which is illustrated as maintained in a storage device 108 of the computing device 102. Such processing includes creation of the digital content 106, modification of the digital content 106, and rendering of the digital content 106 in a user interface 110 for output, e.g., by a display device 112. Examples of digital content 106 include digital documents, digital images, digital media, digital illustrations, and so forth. Although illustrated as implemented locally at the computing device 102, functionality of the content processing system 104 is also configurable as whole or part via functionality available via the network 114, such as part of a web service or "in the cloud."

An example of functionality incorporated by the content processing system 104 to process the digital content 106 is illustrated as a digital object fusion system 116. The digital object fusion system 116 is configured to fuse digital objects (illustrated as objects 118) together to form a fused object. In the illustrated user interface 110, for instance, a base object 120 and an adornment object 122 are moved within a threshold proximity to each other. This causes the digital object fusion system 116 to generate a fused object 124 as a combination of the objects that share a visual style, automatically and without user intervention in real time. The digital object fusion system 116, for instance, generates the fused object 124 to have a visual style of the adornment object 122 in this example, although other examples are also contemplated in which a visual style of the base object 120 is propagated to the adornment object 122 to form the fused object 124.

The objects 118 (e.g., the base object 120 and the adornment object 122) are configurable in a variety of ways, examples of which include raster objects, vector objects, and so forth. The base object 120, for instance, is configured as a glyph. Scripts correspond to collections of letters, numbers, and symbols, e.g., Latin, Greek, and so on. Accordingly, scripts include a multitude of fonts. Fonts specify a set of the letters, numbers, and symbols of the script in a particular style and size. Glyphs are elemental symbols with respective fonts corresponding to individual instances of the letters, numbers, and symbols in the particular style and size for the font. The glyphs are identifiable using a respective Unicode identifier (ID), i.e., Unicode value. In this way, scripts, fonts included in the scripts, and glyphs included as part of the fonts are usable to provide a multitude of different visual representations of elemental symbols.

As previously described, conventional techniques that are used for combining digital objects are destructive and therefore "break" further text editability of the glyph. This causes the glyph to no longer support typographic operations. However, in the techniques described herein the digital object fusion system 116 is configured to form the fused object 124 as supporting continued editability (e.g., using typographic operations) as well as "back out" edits made to the base object 120 and the adornment object 122. Further discussion of these and other examples is included in the following sections and shown in corresponding figures.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Digital Object Fusion

Figure 8:
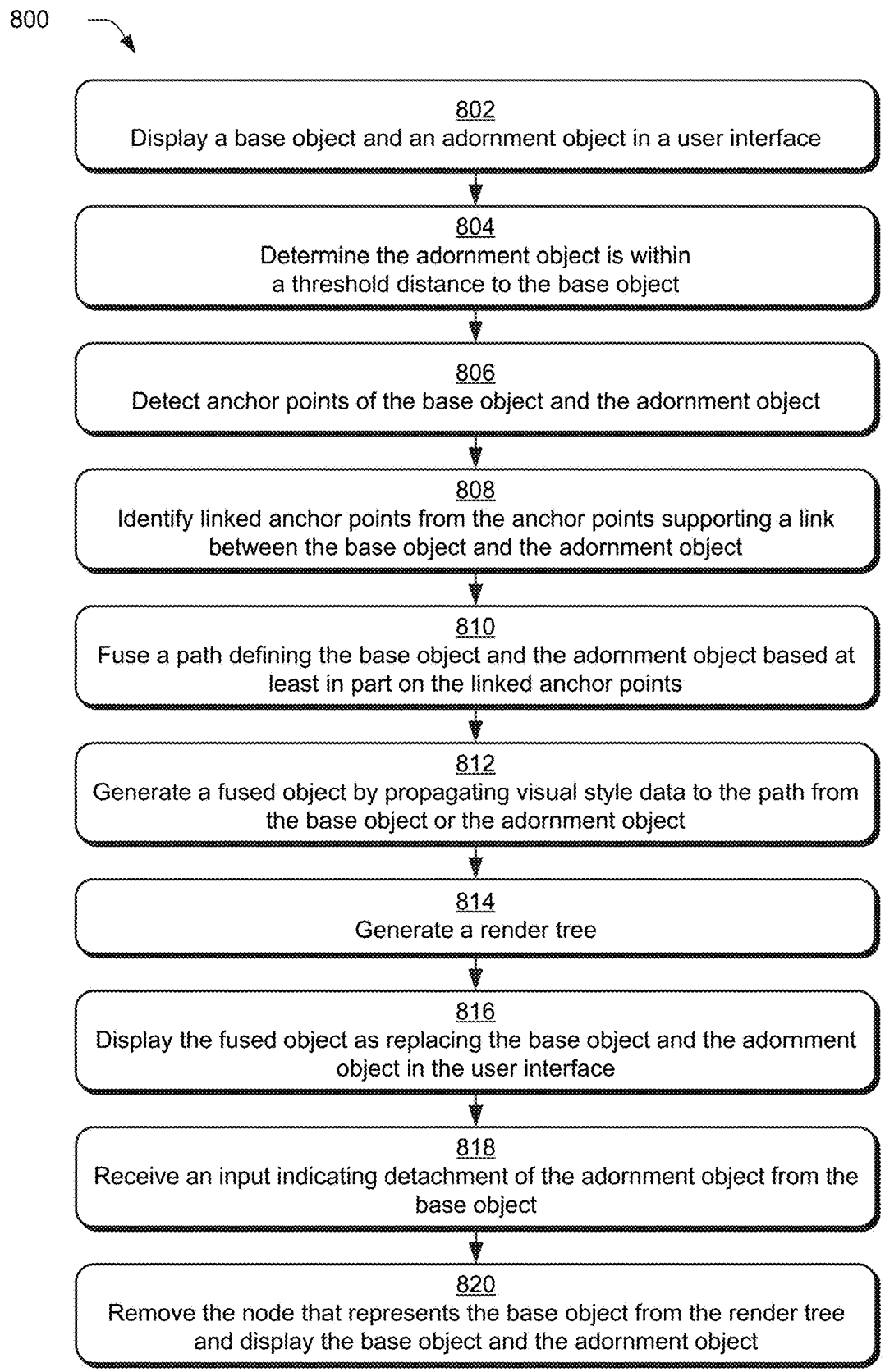
FIG. 8 is a flow diagram depicting an algorithm as a step-by-step procedure in an example implementation of operations performable for accomplishing a result of generating a fused digital object from a base object and an adornment object.

The following discussion describes digital object fusion techniques that are implementable utilizing the described systems and devices. Aspects of the procedure is implemented in hardware, firmware, software, or a combination thereof. The procedure is shown as a set of blocks that specify operations performable by hardware and are not necessarily limited to the orders shown for performing the operations by the respective blocks. Blocks of the procedure, for instance, specify operations programmable by hardware (e.g., processor, microprocessor, controller, firmware) as instructions thereby creating a special purpose machine for carrying out an algorithm as illustrated by the flow diagram. As a result, the instructions are storable on a computer-readable storage medium that causes the hardware to perform algorithm. In portions of the following discussion, reference will be made in parallel to FIG. 8, which is a flow diagram depicting an algorithm 800 as a step-by-step procedure in an example implementation of operations performable for accomplishing a result of generating a fused digital object from a base object and an adornment object.

Figure 2:
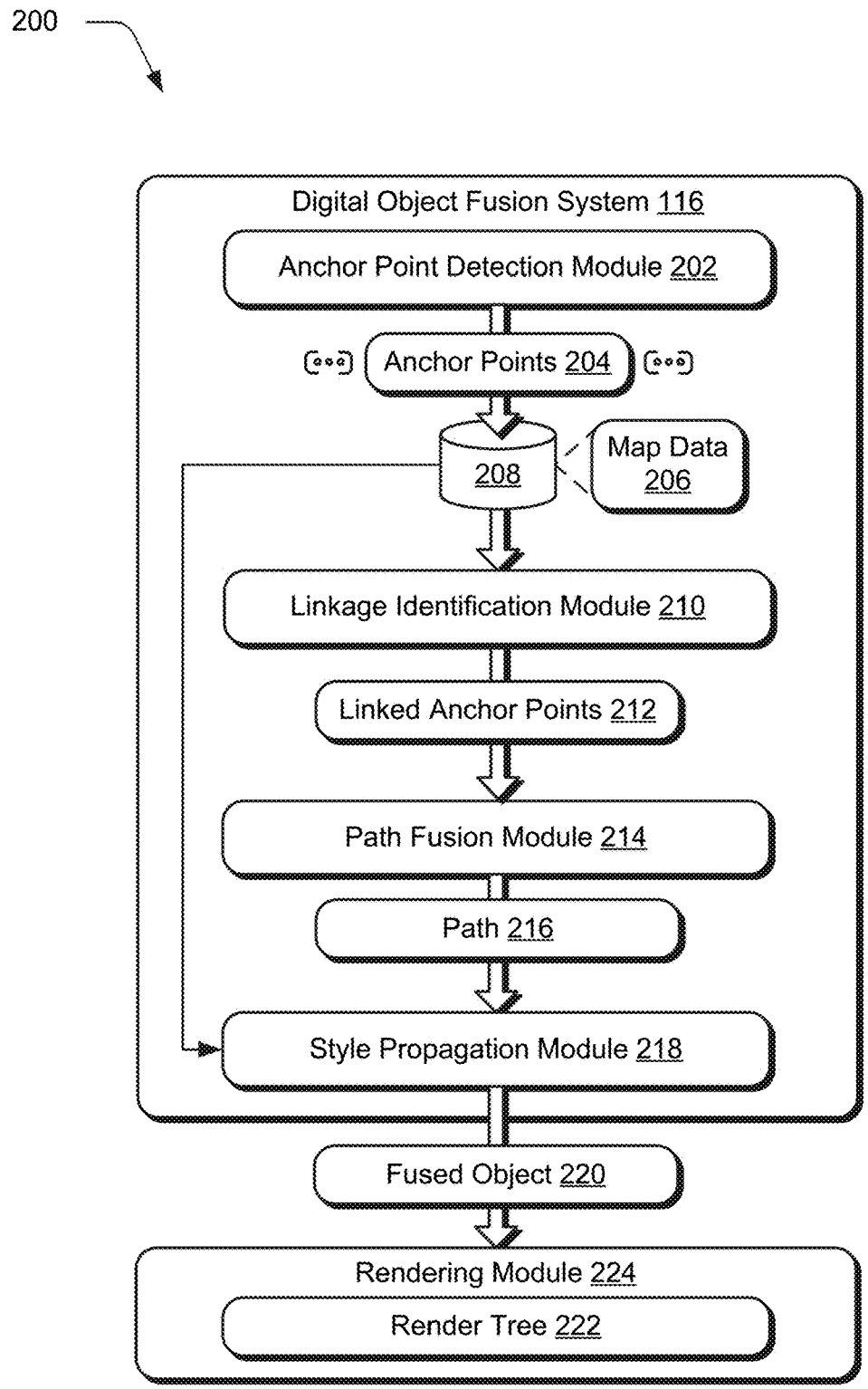
FIG. 2 depicts a system in an example implementation showing operation of a digital object fusion system of FIG. 1 in greater detail.

FIG. 2 depicts a system 200 in an example implementation showing operation of the digital object fusion system 116 of FIG. 1 in greater detail. To begin, a base object 120 and an adornment object 122 are displayed in a user interface 110 (block 802) as shown in FIG. 1. A determination is then made that the adornment object 122 is within a threshold distance from the base object 124 (block 804). In response, an anchor point detection module 202 is employed to detect anchor points 204 of the base object 120 and the adornment object 122 are detected (block 806).

Figure 3:
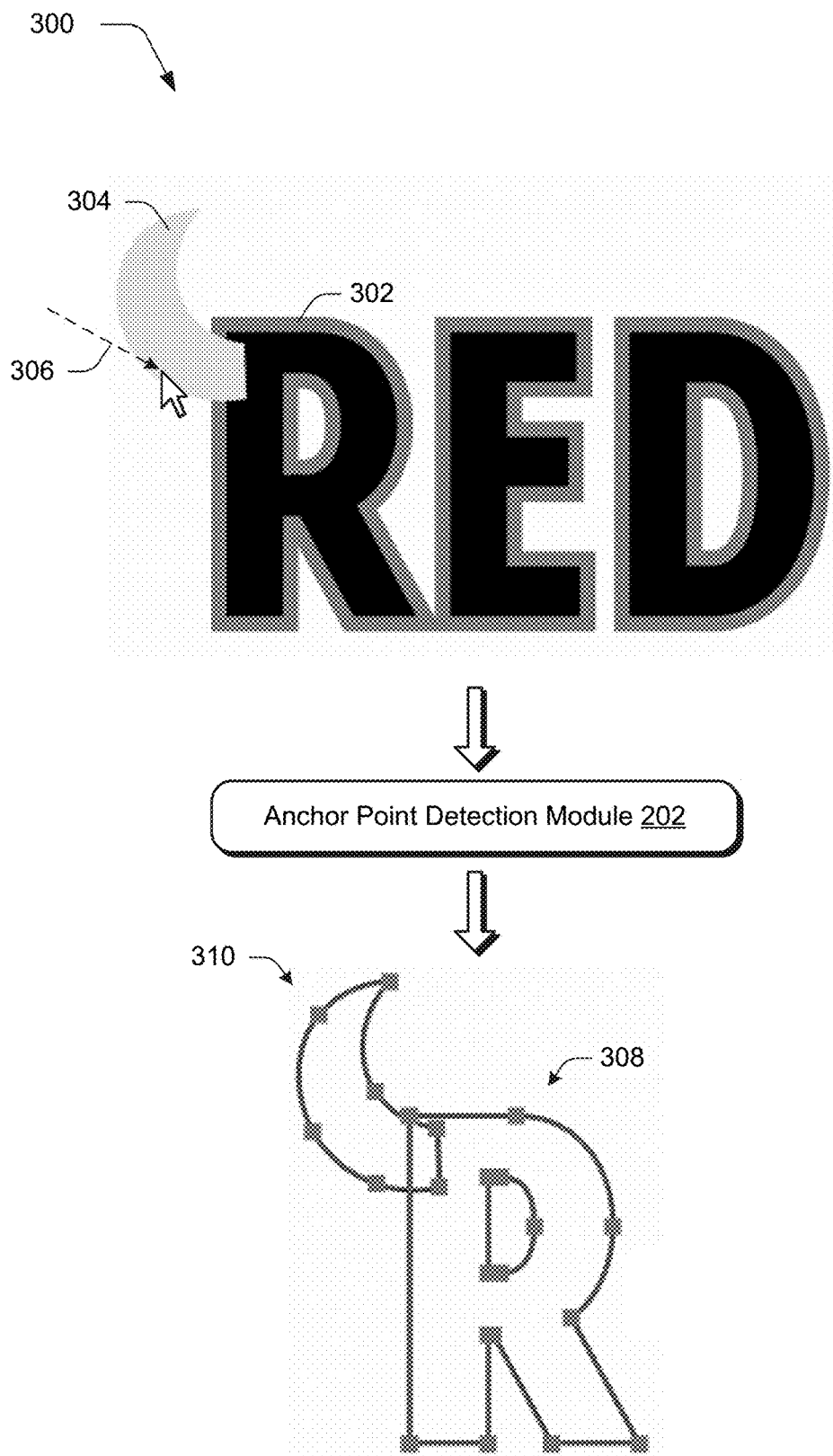
FIG. 3 depicts a system in an example implementation showing operation of an anchor point detection module of FIG. 2 in greater detail as detecting anchor points of a base object and an adornment object.

FIG. 3 depicts a system 300 in an example implementation showing operation of the anchor point detection module 202 of FIG. 2 in greater detail as detecting anchor points of a base object 302 and an adornment object 304. The user input 306 in the illustrated example is a "click-and-drag" operation performed using a cursor control device. Other examples are also contemplated, such as a selection of a representation of a fuse operation from a menu, a spoken utterance, a gesture, and so forth.

In response, the anchor point detection module 202 is employed to detect anchor points 308 of the base object 304 and anchor points 310 of the adornment object 304. The anchor points 308, 310 are detectable in a variety of ways. In a first example, the anchor point detection module 202 detects the anchor points 308, 310 based on a mathematical representation of the base object 120 and adornment object 122, e.g., as vector objects. The anchor points, for instance, define a sequence of Bezier curves that form the respective objects. In another example, the anchor points 308, 310 are detected through conversion of a raster object into a vector object, e.g., also as a sequence of Bezier curves generated for an outside border of the raster object using boundary detection techniques. A variety of other examples are also contemplated.

Returning again the FIG. 2, the linked anchor points 212 are then stored as map data 206 in a storage device 208. The map data 206 includes visual style data of the objects as well as original geometry information of the base object 302 and the adornment object 304, e.g., the anchor points 204. The map data 206 is also configurable to store proximity information (e.g., as an ordered list) describing a relative proximity of the anchor points to each other, e.g., the anchor points 308 of the adornment object 304, respectively, to the anchor points 310 of the user input 306. In this way, the original geometry is maintained, which support an ability to further edit and even remove edits made to the base object 302 and the adornment object 304 as further described below.

The anchor points 204 are then passed as an input to a linkage identification module 210. The linkage identification module 210 is configured to identify linked anchor points 212 from the anchor points 204 that support a link between the base object 302 and the adornment object 304 (block 808) as defined by the anchor points.

Figure 4:
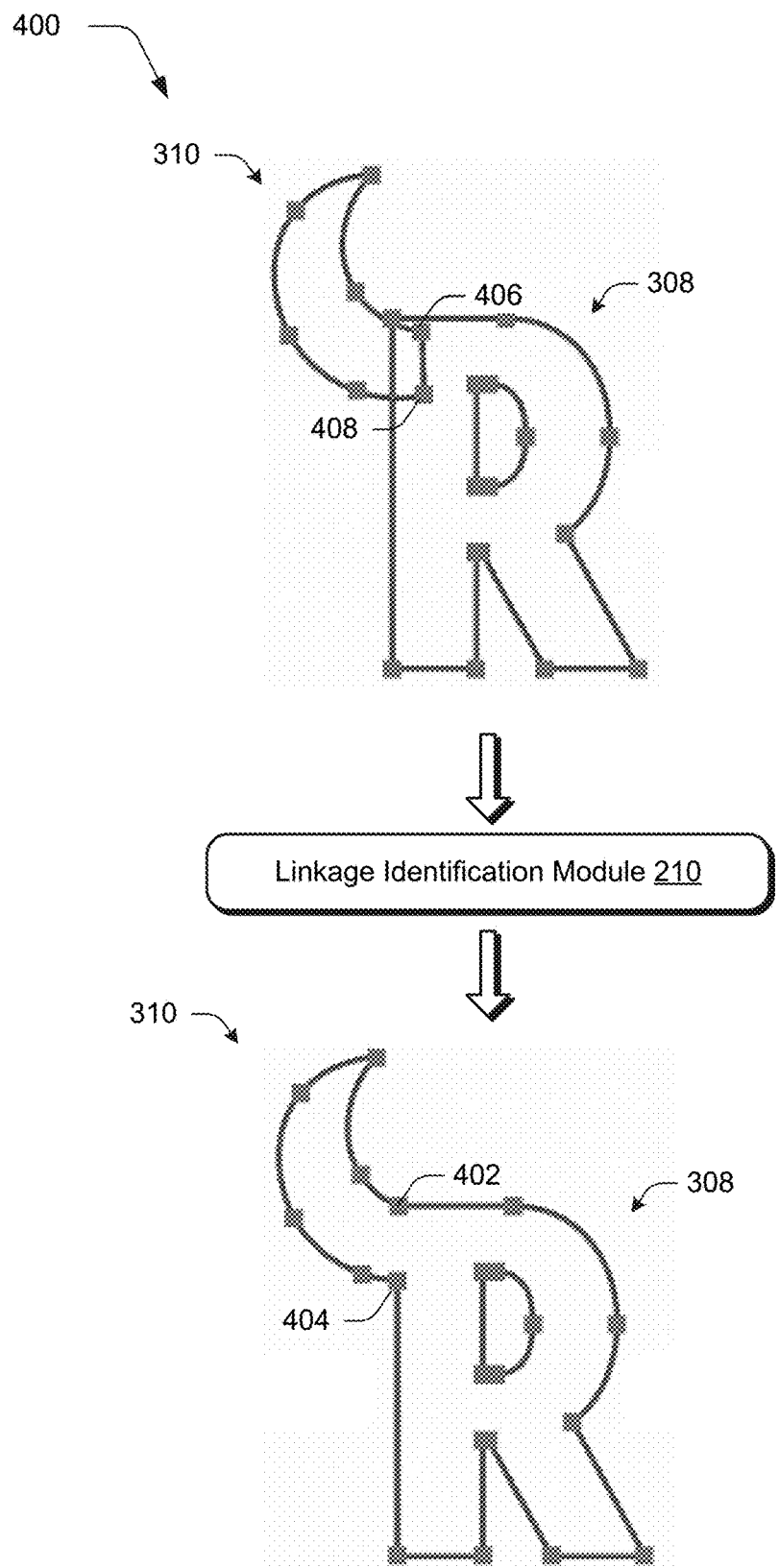
FIG. 4 depicts a system in an example implementation showing operation of a linkage identification module of FIG. 2 in greater detail as detecting linked anchor points.

FIG. 4 depicts a system 400 in an example implementation showing operation of the linkage identification module 210 in greater detail as detecting linked anchor points. The linkage identification module 210, for instance, receives the anchor points 308 of the base object 302 and the anchor points 310 of the adornment object 304. The linkage identification module 210 is then configurable to determine the link based on intersection of outlines of the base object 302 with the adornment object 304.

To do so in the illustrated example, a first linked anchor point 402 is configured at an intersection based on an existing anchor point. The first linked anchor point 402 is configured to join a curve of the base object 302 with a curve of the adornment object 304, i.e., the linked anchor point 408 is shared by the objects. A second linked anchor point 406 is also added as an additional anchor point 406 between base object 302 and the adornment object 304. Thus, the first and second linked anchor points 402, 404 form a link between anchor points 308 of the base object 302 and anchor points 310 of the adornment object 304. Anchor points 406, 408 are removed from the anchor points 310 of the adornment object 304 in the illustrated example thereby forming a continuous ordered sequence defining an outer boundary of a combination of the base object 302 and the adornment object 304. A path fusion module 214 is then employed to fuse a path defining a combination of the base object base object 302 and the adornment object adornment object 304 based at least in part on the linked anchor points 212 (block 810).

Figure 5:
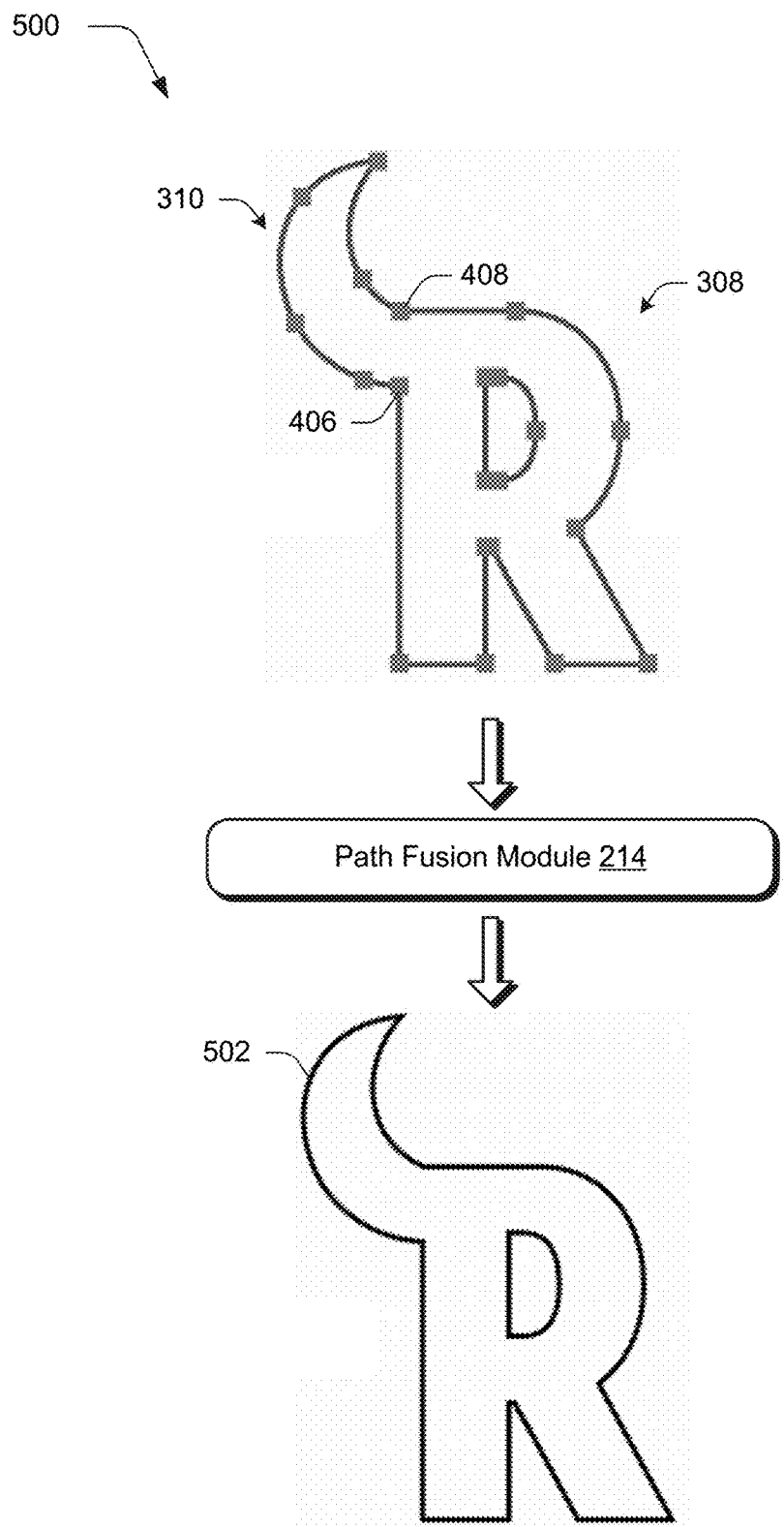
FIG. 5 depicts a system showing operation of a path fusion module of FIG. 2 in greater detail as fusing a path based on linked anchor points output by a linkage identification module of FIG. 4.

FIG. 5 depicts a system 500 showing operation of the path fusion module 214 in greater detail as fusing a path based on the linked anchor points 212 output by the linkage identification module 210 of FIG. 4. The path fusion module 214 is configured to join the remaining anchor points 308, 310 from the base object 302 and adornment object 304 using the first and second linked anchor points 406, 408 of FIG. 4 in this example to form a path 502.

The path fusion module 214 is configurable to generate the path 502 in a variety of ways. The path fusion module 214, for instance, is configured to perform a path merge operation of an outline representation of the base object 302 and the adornment object 304. In a first example, the path 502 is generated using a sweep line approach that lists crossings in a set of line segments, an example of which is described in further detail by J. L. Bentley and T. A. Ottmann. Algorithms for reporting and counting geometric intersections. *IEEE Trans. Comput.*, 28(9):643-647, September 1979, the entire disclosure of which is hereby incorporated by reference. Other examples are also contemplated.

The path 216 is then output by the path fusion module 214 to a style propagation module 218 to generate a fused object 220 by propagating visual style data to the path from the base object or the adornment object (block 812). The visual style data, for instance, may be taken from the base object 302, the adornment object 304, or both (e.g., blended) as stored as part of the map data 206 to propagate a visual style that is consistent within the fused object 220.

Figure 6:
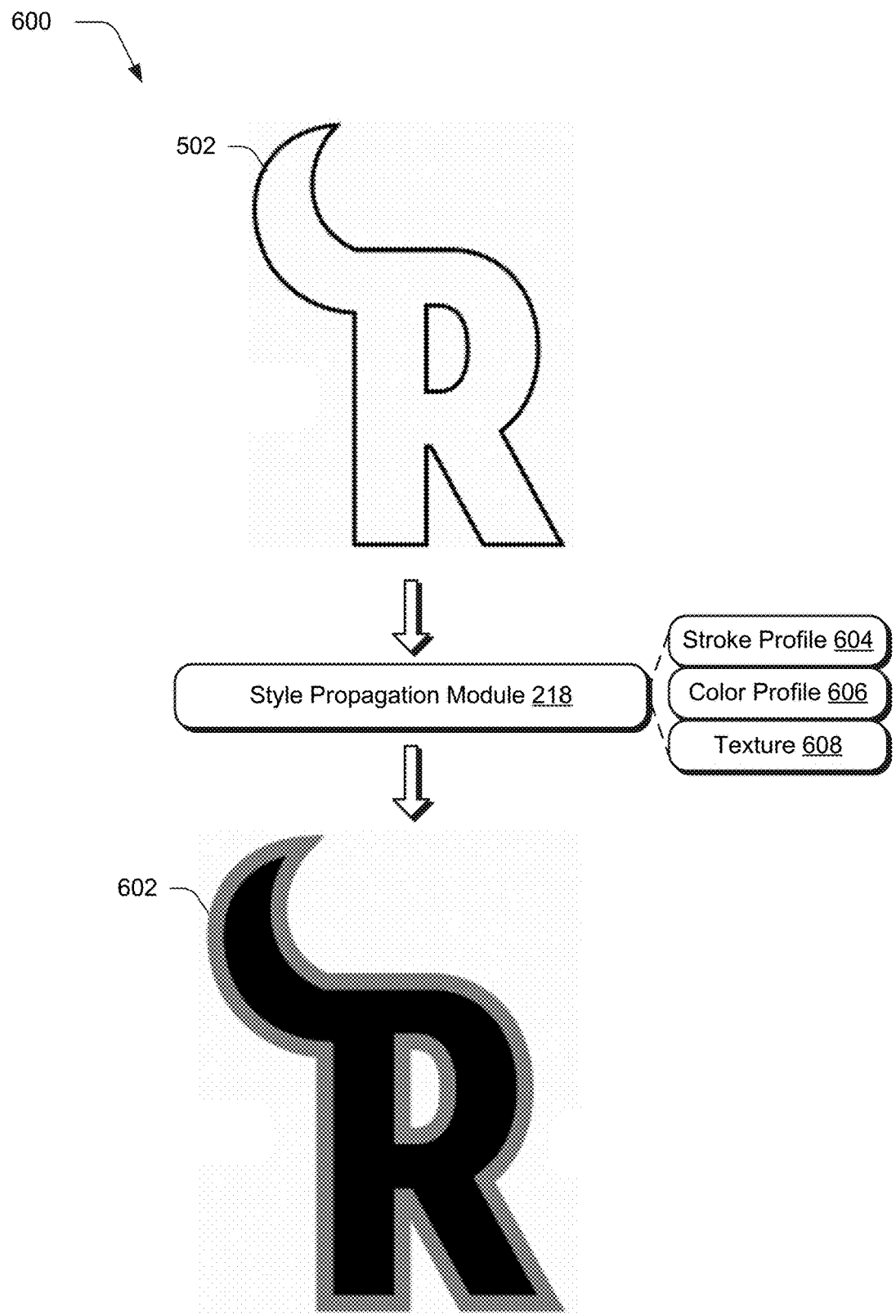
FIG. 6 depicts a system showing operation of a style propagation module of FIG. 2 in greater detail as propagating visual style data to a path of FIG. 5.

FIG. 6 depicts a system 600 showing operation of the style propagation module 218 in greater detail as propagating visual style data to the path 502 of FIG. 5. In the illustrated example, the style propagation module 218 generates the fused object 602 by propagating visual style data from the base object 302, e.g., a stroke profile 604, color profile 606, texture 608, and so on from the map data 206 maintained in the storage device 208 for a respective object. Other examples are also contemplated in which the visual style data is propagated from the adornment object 304 to the path 502.

Returning again to FIG. 2, a render tree 222 is generated (block 814) for rendering the fused object 220 as part of the digital content 106 in the user interface 110. The fused object 220 is displayed as replacing the base object and the adornment object in the user interface 110 (block 816). As previously described, the digital object fusion system 116 is configured to maintain an underlying representation of the base object 120 and adornment object 122. In order to support this ability for continued editing without encountering visual artifacts that would otherwise be generated if rendered separately in the user interface, a rendering tree 222 is configured by a rendering module 224 to control rendering of the fused object 220. An example of which is described in the following discussion and shown in a corresponding figure.

Figure 7:
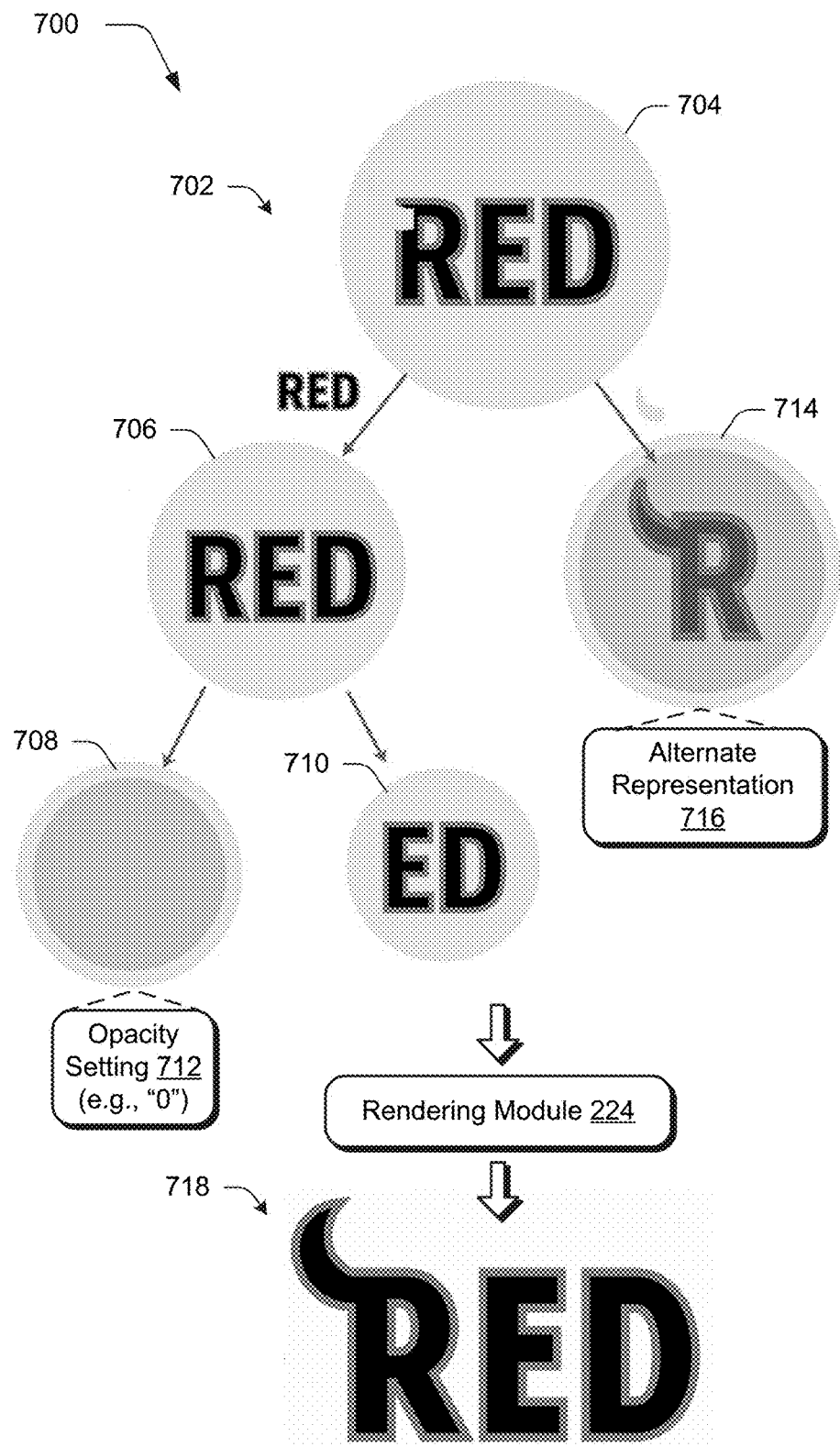
FIG. 7 depicts a system showing operation of a rendering module of FIG. 2 in greater detail as configuring a render tree to render a fused object as generated in FIG. 6.

FIG. 7 depicts a system 700 showing operation of the rendering module 224 in greater detail as configuring a render tree to render the fused object 220 as generated in FIG. 6. The render tree 702 in the illustrated example includes a plurality of nodes that define a rendering order as well as how digital objects are to be rendered in the user interface 110 by the rendering module 224.

The base object is a glyph "R" in the illustrated example and the adornment object is illustrated as a horn. The glyph of the base object is included with other glyphs to form the text "RED." Accordingly, the render tree 702 includes a base node 704 referencing the base object and the adornment object. The rendering module 224 progresses "down" through the render tree 702 through successive levels of nodes, e.g., through a second node 706 that references the glyphs that form the text "RED" which are then divided between a third node 708 representing the base object "R" and a fourth node 710 representing other glyphs to be rendered, e.g., "ED."

In this example, an effect of the base object 302 and the adornment object 304 are removed from the user interface 110 and replaced with rendering of the fused object 220. To do so, a flag may be set for the base object 302 to prevent rendering of the glyph, e.g., as part of a layout engine property implemented by the rendering module 224. In an implementation in which this property is not available, an opacity setting 712 of the base object 302 is set to zero such that the base object 302 does not contribute to color values of pixels rendered in the user interface 110 by the rendering module 224.

The fused object 220 is included in a fifth node 714 of the render tree 702 as an alternate representation 716 of the adornment object 304. Accordingly, a final rendition 718 of the fused object 220 is then rendered by the rendering module 224. In the final rendition 718, the fused object is displayed inline with the other glyphs as text. When the glyph is being drawn, the opacity setting 712 is set to zero and as such does not contribute to pixels rendered in the user interface 110. The rendering module 224 then checks the adornment object 304 and determines whether an alternate representation 716 is available. If so, the rendering module 224 renders the alternate representation 716 of the fifth node 714 instead of the adornment object 304. In this way, the render tree 702 is configurable to render the fused object 220 while still supporting editability by maintaining the base object 302 and the adornment object 304, e.g., as part of the map data 206.

The digital object fusion system 116, for instance, receives an input indicating detachment of the adornment object from the base object (block 818). The user input, for instance, corresponds to a portion of the fused object 220 that corresponds to the adornment object 304 is selected and moved, a transformation is applied, a link between the base object 302 and the adornment object 304 is broken, and so forth. In response, the node that represents the fused object 220 is removed from the render tree 222, e.g., the fifth node 714 as an alternate representation 716. The base object 302 and the adornment object 304 are displayed (block 820), e.g., by resetting the opacity setting 712 of the base object 302 to one thereby causing color values of the base object 302 to affect color values rendered in the user interface 110. In this way, the digital object fusion system 116 supports a "single click" process performable in real time to generate the fused object 124 without manual intervention or redundant operations as involved in conventional techniques, thereby improving computing device operation and user efficiency.

Example System and Device

Figure 9:
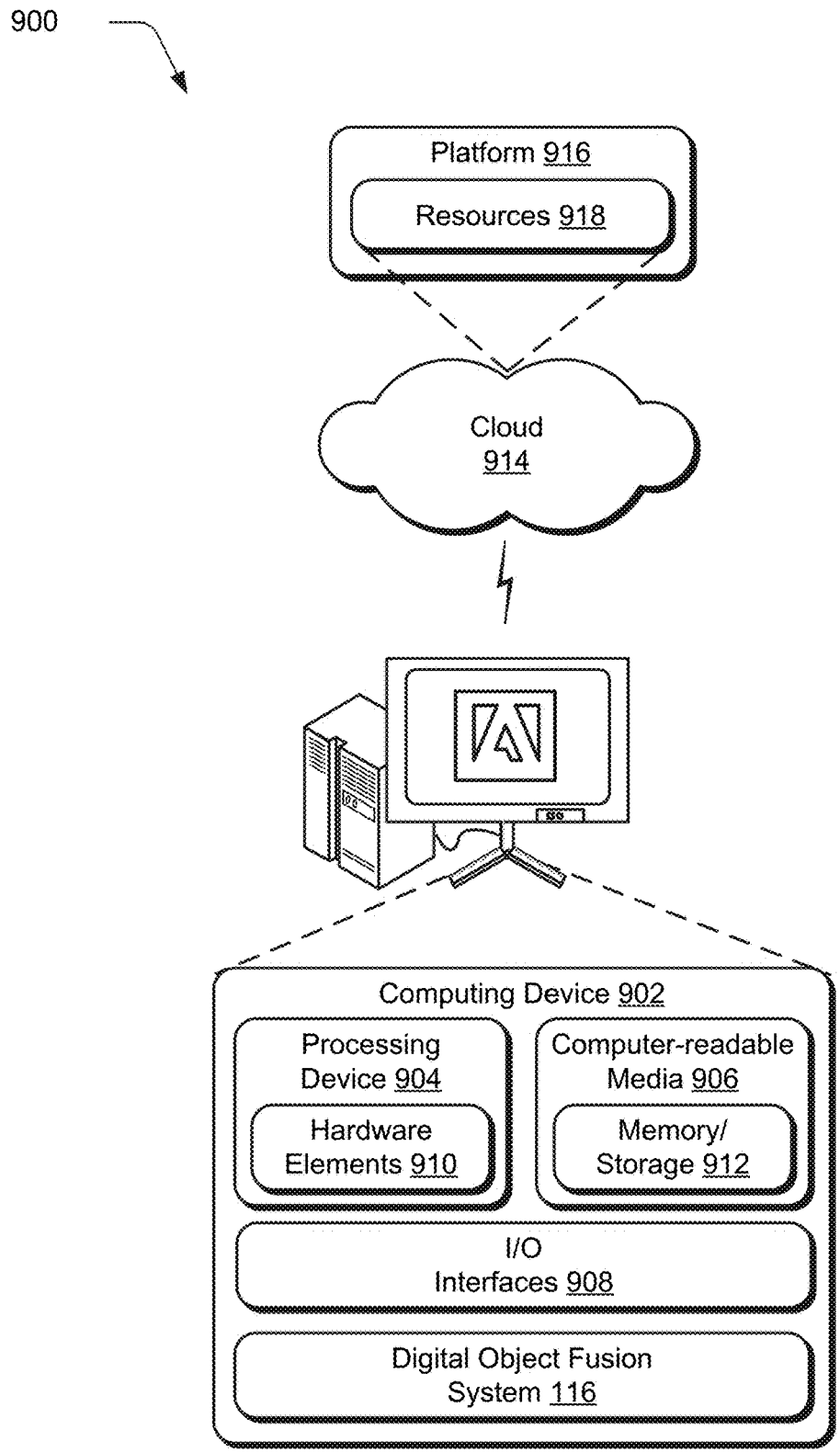
FIG. 9 illustrates an example system including various components of an example device that can be implemented as any type of computing device as described and/or utilize with reference to FIGS. 1-8 to implement embodiments of the techniques described herein.

FIG. 9 illustrates an example system generally at 900 that includes an example computing device 902 that is representative of one or more computing systems and/or devices that implement the various techniques described herein. This is illustrated through inclusion of the digital object fusion system 116. The computing device 902 is configurable, for example, as a server of a service provider, a device associated with a client (e.g., a client device), an on-chip system, and/or any other suitable computing device or computing system.

The example computing device 902 as illustrated includes a processing device 904, one or more computer-readable media 906, and one or more I/O interface 908 that are communicatively coupled, one to another. Although not shown, the computing device 902 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing device 904 is representative of functionality to perform one or more operations using hardware. Accordingly, the processing device 904 is illustrated as including hardware element 910 that is configurable as processors, functional blocks, and so forth. This includes implementation in hardware as an application specific integrated circuit or other logic device formed using one or more semiconductors. The hardware elements 910 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 906 is illustrated as including memory/storage 912 that stores instructions that are executable to cause the processing device 904 to perform operations. The memory/storage 912 represents memory/storage capacity associated with one or more computer-readable media. The memory/storage 912 includes volatile media (such as random access memory (RAM)) and/or nonvolatile media (such as read only memory (ROM), Flash memory, optical disks, magnetic disks, and so forth). The memory/storage 912 includes fixed media (e.g., RAM, ROM, a fixed hard drive, and so on) as well as removable media (e.g., Flash memory, a removable hard drive, an optical disc, and so forth). The computer-readable media 906 is configurable in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 902. By way of example, and not limitation, computer-readable media includes "computer-readable storage media" and "computer-readable signal media."

"Computer-readable storage media" refers to media and/or devices that enable persistent and/or non-transitory storage of information (e.g., instructions are stored thereon that are executable by a processing device) in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 902, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 910. The computing device 902 is configured to implement particular instructions and/or functions corresponding to the software and/or hardware modules. Accordingly, implementation of a module that is executable by the computing device 902 as software is achieved at least partially in hardware, e.g., through use of computer-readable storage media and/or hardware elements 910 of the processing device 904. The instructions and/or functions are executable/operable by one or more articles of manufacture (for example, one or more computing devices 902 and/or processing devices 904) to implement techniques, modules, and examples described herein.

The techniques described herein are supported by various configurations of the computing device 902 and are not limited to the specific examples of the techniques described herein. This functionality is also implementable all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 include applications and/or data that can be utilized while computer processing is executed on servers that are remote from the computing device 902. Resources 918 can also include services provided over the Internet and/or through a subscriber network, such as a cellular or Wi-Fi network.

The platform 916 abstracts resources and functions to connect the computing device 902 with other computing devices. The platform 916 also serves to abstract scaling of resources to provide a corresponding level of scale to encountered demand for the resources 918 that are implemented via the platform 916. Accordingly, in an interconnected device embodiment, implementation of functionality described herein is distributable throughout the system 900. For example, the functionality is implementable in part on the computing device 902 as well as via the platform 916 that abstracts the functionality of the cloud 914.

In implementations, the platform 916 employs a "machine-learning model" that is configured to implement the techniques described herein. A machine-learning model refers to a computer representation that can be tuned (e.g., trained and retrained) based on inputs to approximate unknown functions. In particular, the term machine-learning model can include a model that utilizes algorithms to learn from, and make predictions on, known data by analyzing training data to learn and relearn to generate outputs that reflect patterns and attributes of the training data. Examples of machine-learning models include neural networks, convolutional neural networks (CNNs), long short-term memory (LSTM) neural networks, decision trees, and so forth.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
    receiving, by a processing device, a base object and an adornment object;
    detecting, by the processing device, anchor points of the base object and the adornment object;
    identifying, by the processing device, linked anchor points from the anchor points supporting a link between the base object and the adornment object;
    fusing, by the processing device, a path defining the base object and the adornment object based at least in part on the linked anchor points;
    generating, by the processing device, a fused object by propagating visual style data to the path from the base object or the adornment object; and
    displaying, by the processing device, the fused object in a user interface.

2. The method as described in claim 1, wherein the base object is a glyph.

3. The method as described in claim 1, wherein the displaying causes the fused object to replace the base object and the adornment object in the user interface.

4. The method as described in claim 1, wherein the visual style data includes a color profile and a stroke profile.

5. The method as described in claim 1, wherein the anchor points of the base object define a boundary of the base object and the anchor points of the adornment object define a boundary of the adornment object.

6. The method as described in claim 1, wherein the identifying is based on proximity of the anchor points of the base object and the anchor points of the adornment object, one to another.

7. The method as described in claim 1, wherein the path is defined by one or more Bezier curves.

8. The method as described in claim 1, further comprising storing map data responsive to the identifying, the map data including the anchor points of the base object and the adornment object and proximity anchor information defining proximity of the anchor points of the base object to anchor points of the adornment object.

9. The method as described in claim 1, further comprising generating a render tree including a plurality of nodes including a node that represents the base object and a node that represents the fused object.

10. The method as described in claim 9, wherein the fused object is registered as an alternate representation of the adornment object in the render tree.

11. The method as described in claim 9, wherein the displaying is performed such that the node that represents the base object is set as having an opacity value of zero.

12. The method as described in claim 11, further comprising:
    receiving an input indicating detachment of the adornment object from the base object; and
    responsive to the input, removing the node that represents the base object from the render tree and resetting the opacity value of the node that represents the base object to one.

13. A system comprising:
    an anchor point detection module implemented by a processing device to detect anchor points of a glyph and an adornment object;
    a linkage identification module implemented by the processing device to identify linked anchor points based on the anchor points;

a path fusion module implemented by the processing device to fuse a path including the glyph and the adornment object based at least in part on the linked anchor points;
a style propagation module implemented by the processing device to generate a fused object by propagating visual style data to the path from the glyph or the adornment object; and
a rendering module implemented by the processing device to rendering the fused object with at least one other glyph in a user interface.

14. The system as described in claim 13, wherein the rendering includes rendering the fused object inline with the at least one other glyph in the user interface.

15. The system as described in claim 13, wherein the path is formed as a sequence of Bezier curves defined between respective anchor points of the glyph and the adornment object.

16. The system as described in claim 13, wherein the rendering module is configured to generate a render tree including a plurality of nodes including a node that represents the glyph and a node that represents the fused object.

17. The system as described in claim 16, wherein the fused object is registered as an alternate representation of the adornment object in the render tree.

18. One or more computer-readable storage media storing instructions that are non-transitory, responsive to execution by a processing device, causes the processing device to perform operations including:
    displaying a base object and an adornment object in a user interface;
    detecting anchor points of the base object and the adornment object;
    fusing a path defining the base object and the adornment object by identifying linked anchor points from the anchor points of the base object and the adornment object;
    generating a fused object by propagating visual style data to the path from the base object or the adornment object; and
    replacing the display of the base object and the adornment object in the user interface with the fused object.

19. The one or more computer-readable storage media as described in claim 18, wherein the base object is a glyph and the replacing includes replacing the base object as displayed in the user interface inline with at least one other glyph with the fused object.

20. The one or more computer-readable storage media as described in claim 18, further comprising generating a render tree including a plurality of nodes including a node that represents the base object and a node that represents the fused object as an alternate representation of the adornment object.

* * * * *